United States Patent [19]

Corompt

[11] Patent Number: 4,548,541

[45] Date of Patent: Oct. 22, 1985

[54] METHOD AND APPARATUS FOR UNLOADING A PIECE OF EQUIPMENT PLACED ON A CARRYING VEHICLE

[75] Inventor: Antoine Corompt, Loire, France

[73] Assignee: Bennes Marrel, France

[21] Appl. No.: 517,290

[22] Filed: Jul. 29, 1983

[51] Int. Cl.[4] .............................................. B60P 1/30
[52] U.S. Cl. .................................... 414/479; 298/14;
414/469; 414/786
[58] Field of Search ............... 414/477, 478, 479, 480,
414/494; 298/14

[56] References Cited

U.S. PATENT DOCUMENTS

| | | | |
|---|---|---|---|
| 1,455,821 | 5/1923 | Swanson | 414/477 X |
| 2,082,663 | 6/1937 | Slater | 414/477 |
| 2,588,001 | 3/1952 | Holland | 414/477 |
| 2,621,814 | 12/1952 | Lisota | 414/477 |
| 3,074,574 | 1/1963 | Prince | 298/14 X |
| 3,987,918 | 10/1976 | Corompt | 414/494 X |
| 4,015,879 | 4/1977 | Shonkwiler | 414/477 X |
| 4,147,266 | 4/1979 | Corompt | 414/480 |
| 4,318,657 | 3/1982 | Znidaric | 414/478 |

FOREIGN PATENT DOCUMENTS 2297747  4/1978  France .

*Primary Examiner*—Leslie J. Paperner
*Assistant Examiner*—Stuart J. Millman
*Attorney, Agent, or Firm*—Remy J. VanOphem

[57] ABSTRACT

A method and apparatus for loading of a piece of equipment on a lorry. The apparatus includes an arm pivotally interconnected with the lorry and a first jack interposed the lorry and the arm. A jib is telescopically interconnected with the arm. A movable platform is interconnected with a hook on the jib. A cable passes over a pulley interconnected with the movable platform and is hooked to the chassis at one of its ends and to the piece of equipment at the other of its ends. The method includes the steps of moving the piece of equipment rearwardly along the movable platform, the movement of the piece of equipment therealong acting through the cable and pulley to displace the movable platform rearwardly relative to the lorry until the movable platform and the piece of equipment are displaced to a position wherein they are unbalanced on the lorry. Gravity is then used to permit the lowering, by a tilting action, of the movable platform.

19 Claims, 5 Drawing Figures

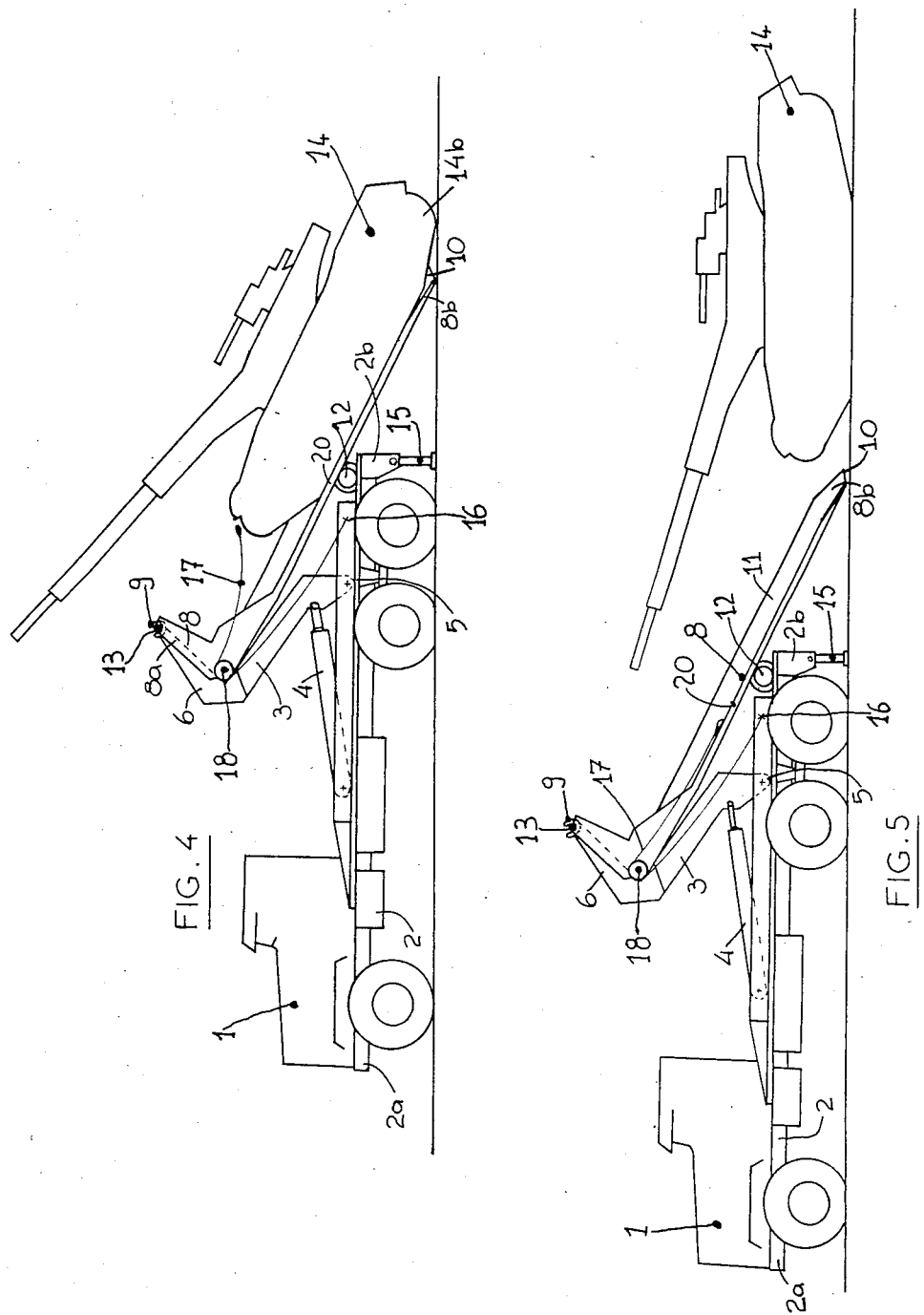

METHOD AND APPARATUS FOR UNLOADING A PIECE OF EQUIPMENT PLACED ON A CARRYING VEHICLE

BACKGROUND OF THE INVENTION

The present invention relates to a method and an apparatus for unloading a piece of equipment placed on a carrying vehicle or lorry. As used herein, the term lorry refers to any truck, trailer, railcar or similar transport vehicle used to transport equipment including, for example, flat bed trucks used for transporting large self-propelled land vehicles.

Various lorries are known in the prior art having a vehicle chassis equipped with a jib hinged on the forward portion of an arm. The rearward portion of the arm is hinged on the rearward portion of the vehicle chassis of the lorry. A jack is interposed between the vehicle chassis and the arm to control the tilting motion of the arm relative to the vehicle chassis.

An unloading apparatus is provided for lorries of this type to load, unload, and transport equipment on the chassis of the lorry. An example of an unloading apparatus of this type is described, for example, in French Pat. No. 2,297,747. The unloading apparatus is provided with an equipment-carrying platform, the forward portion of which is connected to the jib.

Vehicles of this type have a major disadvantage. When their engines or their hydraulic parts break down, it is impossible to recover the piece of equipment from the lorry without the aid of a crane.

SUMMARY OF THE INVENTION

The primary object of the present invention is to avoid this disadvantage. According to the apparatus of the present invention, a piece of equipment placed on a lorry or carrying vehicle equipped with the known apparatus defined above is modified by connecting the equipment to one end of a cable. The other end of the cable is connected to the vehicle chassis at a location adjacent the rearward end of the vehicle chassis, an intermediate portion of the cable between the one end and the other end passing over a pulley interconnected with the equipment-carrying platform.

The method of the present invention includes the successive steps of positioning manually controlled stability props, opening the valve corresponding to the large cross-section of the jack for telescoping the jib in the arm, and reversing the equipment. Reversing the equipment causes the tensioning of the cables, and then the reversing of the assembly consisting of the platform plus equipment rearwardly until a reference mark on the platform is aligned with the rear hinge joint. Next, the method provides for closing the valve corresponding to the large cross-section of the telescoping jack and opening the valve corresponding to the small cross-section of the hydraulic jack for tilting the arm, the arm and the platform which it supports then being driven in a downward self-tilting movement until the rear of the equipment touches the ground. Finally, the method includes unhooking the cable from the heavy equipment and disengaging of the heavy equipment by its own means.

In the above described method, the heavy equipment can, for example, be tracked equipment such as a battle tank.

One significant feature of the preferred embodiment of the present invention is that the movable platform incorporates a first reference mark which, when aligned with a second reference mark on the vehicle chassis, indicates the tilting position for the assembly consisting of the platform and the equipment.

Another significant feature of the preferred embodiment of the present invention is that the tilting speed of the assembly consisting of the arm and the platform supporting the equipment is controlled by the selective operation of a valve corresponding to the small cross-section of the jack for tilting the arm.

BRIEF DESCRIPTION OF THE DRAWINGS

The attached drawings, given by way of non-limiting example, will make it possible to better understand the characteristics of the present invention.

FIGS. 1 through 5 show the various stages of the apparatus and the method of unloading the equipment according to the method of the invention and more particularly:

FIG. 1 depicts the unloading apparatus in the transporting position;

FIG. 2 depicts the unloading apparatus in the horizontally extended position;

FIG. 3 depicts the unloading apparatus partially tilted downwardly from the horizontally extended position;

FIG. 4 depicts the unloading apparatus fully tilted downwardly from the horizontally extended position; and FIG. 5 depicts the unloading apparatus in the position of FIG. 4 with the equipment being transported removed therefrom.

DETAILED DESCRIPTION OF THE PREFERRED EMBODIMENT

Figure 1:
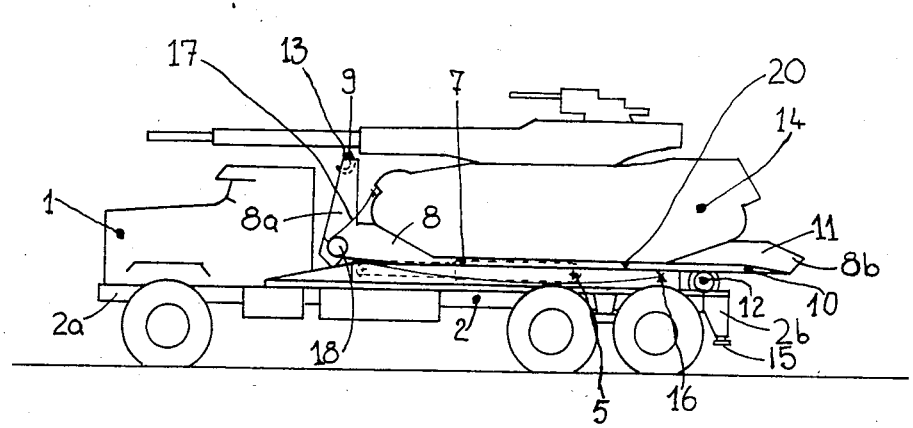

Referring now to the drawings, a lorry 1 is illustrated incorporating the method and apparatus of the present invention. In the example illustrated, the lorry 1 is a flatbed truck.

The lorry 1 incorporates a vehicle chassis 2 which is horizontally disposed and has a forward end 2a and a rearward end 2b. An arm 3 is pivotally interconnected by means of a transverse axle 5 to the vehicle chassis 2. The arm 3 can pivot in relation to the vehicle chassis 2 under the effect of a first hydraulic jack 4 mechanically interposed the vehicle chassis 2 and the arm 3. The arm 3 extends generally from the transverse axle 5 towards the forward end 2a of the vehicle chassis 2.

The base of a jib 6 is hingedly interconnected on the end of the arm 3 which is furthest from the transverse axle 5. The jib 6 can be telescoped in the direction of the arm 3 under the control of a second hydraulic jack 7, shown only schematically in FIG. 1, but well known in the art. The end of the jib 6 furthest from the arm 3 is provided with a hook 9 for a purpose to be described shortly.

A movable plaform 8 is placed on the arm 3. The movable platform 8 has a forward end 8a directed toward the forward end 2a of the vehicle chassis 2 and a rearward end 8b overlying the rearward end 2b of the vehicle chassis.

The movable platform 8 has an upper part provided with an access ramp 10 adjacent the rearward end 8b thereof and lateral guides 11 extending along the length of the movable platform 8. The movable platform 8 has a lower part which can roll on rollers 12 which are rotatably mounted to the vehicle chassis 2 adjacent the rearward end 2b thereof. The movable platform 8 is further provided at its forward end with a crosspin or gripping shackle 13 which interacts with the hook 9 of the jib 6. The movable platform 8 is capable of supporting a piece of equipment 14 to be transported by the lorry 1. In the example illustrated, the equipment 14 is a battle tank.

The rearward end 2b of the vehicle chassis 2 is provided with removable or extensible props 15 or a similar support which supports some of the weight of the piece of equipment 14 while it is being unloaded from the lorry 1.

The hydraulic circuit of the lorry 1, not illustrated, is equipped with a first and second valve, also not illustrated, but well known in the art. The opening and closing of the valves can be effected by a manual control. This makes it possible to selectively connect the various chambers of the first and second hydraulic jacks 4 and 7 to the hydraulic oil tank of the lorry 1. These valves are of the needle type and, therefore, enable the oil flow rate to be controlled.

These arrangements are known and make it possible, when a known method is used, to load and unload a piece of equipment 14 even if the piece of equipment is not operating. In contrast to this, the method and apparatus according to the present invention makes it possible to unload the piece of equipment 14 when the lorry 1 has broken down.

On each side of the movable platform 8, a cable 17 connects the piece of equipment 14 to a fixed point 16 of the chassis 2. This point 16 is located towards the rearward end 2b of the vehicle chassis 2. The cable 17 passes over a pulley 18 which is mounted to the forward end 8a of the movable platform 8.

Operation of the above described apparatus will now be explained in detail.

The lorry 1 as a whole, on which the piece of equipment 14 is placed, is shown in the transporting position in FIG. 1. In this position, the removable or extensible props 15 are in an upper position, the cable 17 is relaxed, and the jib 6 is telescoped relative to the arm 3 completely towards the forward end 2a of the vehicle chassis 2.

Figure 2:
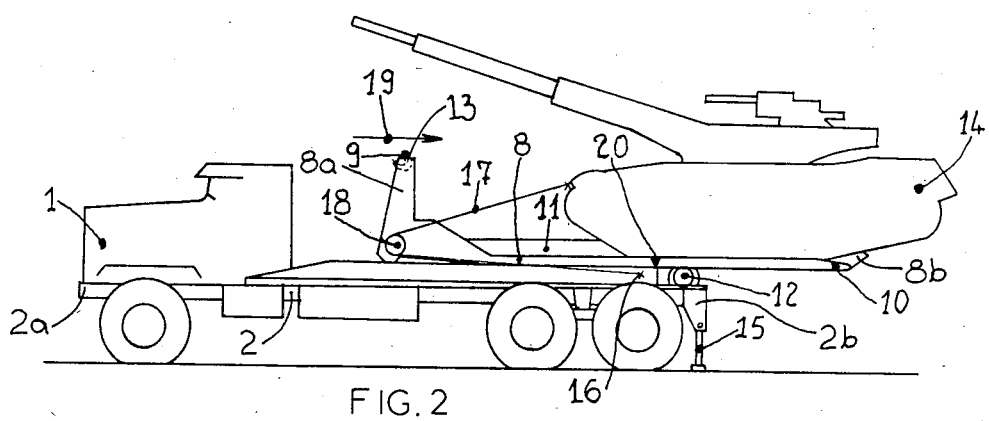
Figure 3:
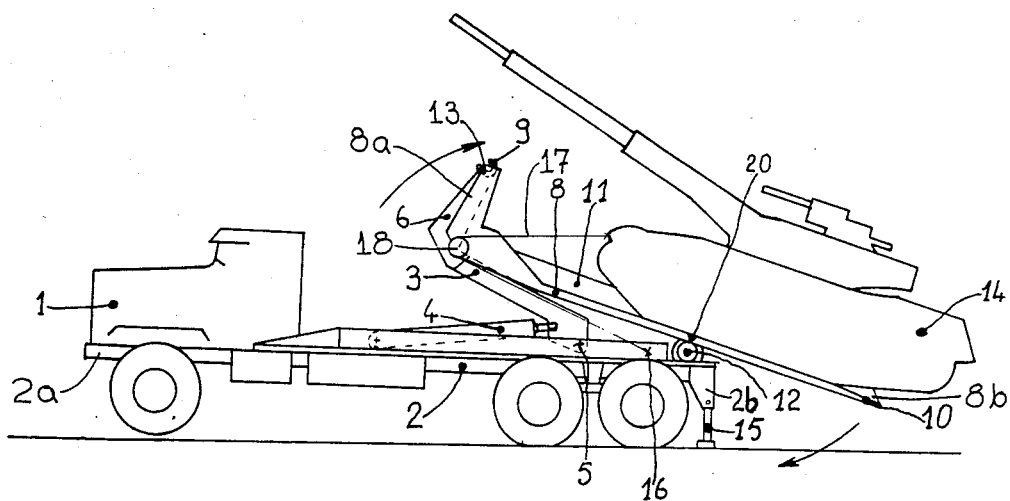

As shown in FIG. 2, when the piece of equipment 14 is unloaded, the removable or extesible props 15 are lowered. In the illustrated example, the gun of the tank is raised slightly. All of the conventional arrangements for lashing the piece of equipment 14 to the movable platform 8 during transport, which have not been illustrated in FIG. 1 since they are well known in the art, are removed. The lorry 1 is stopped with its brakes locked. The valve corresponding to the large cross-section of the second hydraulic jack 7 is opened. The piece of equipment 14 is moved relative to the movable platform 8 towards the rearward end thereof in order to put the cables 17 under tension. In the illustrated embodiment, the piece of equipment 14 is self-propelled and is, therefore, moved rearwardly by its own power.

This rearward motion of the piece of equipment 14 then causes the rearward motion of the movable platform 8 and the jib 6, according to the arrow 19 in FIG. 2, as a result of the action of the cables 17 on the pulleys 18. The movable platform 8, thus, slides rearwardly on the rollers 12 and the vehicle chassis 2.

A reference mark 20 located on the side of the movable platform 8 makes it possible to identify that position of the movable platform 8 and the piece of equipment 14 relative to the vehicle chassis 2 which unbalances the assembly. In this unbalanced position, most of the weight is on the rearward end of the vehicle chassis 2, and the forward end 2a of the vehicle chassis rises by an amount determined by the lift of the removable or extensible props 15.

In this position of the movable platform 8, the second valve corresponding to the second hydraulic jack 7 is closed, and the first valve corresponding to the small cross-section of the first hydraulic jack 4 is opened. It will be recalled that the piece of equipment 14 is stopped and its brakes are locked. The opening of the first valve makes it possible for the assembly consisting of the arm 3 and the movable platform 8 to tilt, respectively, about the transverse axle 5 and the rollers 12. This tilting is automatically caused by gravity as a result of the inbalance of the assembly. The tilting speed can be controlled by the selective opening of the first valve corresponding to the first hydraulic jack 4 to a greater or lesser extent.

As soon as a rearward end 14b of the piece of equipment 14 touches the ground, as shown in FIG. 4, the tilting movement stops and the forward end 2a of the vehicle chassis 2 comes to rest again on the front axle. The cables 17 are then unhooked and the piece of equipment 14 can be removed from the platform, preferably by its own power, and the unloading operation is complete.

The method of the present invention can be used for unloading any self-propelled equipment placed on the lorry, for example, combat equipment, public works equipment or any other vehicle. The invention is especially useful for transporting military equipment, particularly in the event of a conflict. If the lorry is damaged during a battle, it will still be possible to recover the piece of equipment by means of the method according to the invention.

The above constitutes a detailed description of the present invention by way of an exemplary embodiment. Variations therefrom will be apparent to those skilled in the art and are included within the intended scope of the claims appended hereto.

What is claimed as novel is as follows:

1. Apparatus for unloading a piece of equipment from a lorry having a forward end and a rearward end, said lorry defining a forward direction from said rearward end toward said forward end and a rearward direction from said forward end toward said rearward end, said apparatus comprising:

an arm having a first end and a second end opposite said first end, said first end being pivotally interconnected with said lorry at a first predetermined location remote from said rearward end, said arm being pivotable between a lowered position wherein said second end extends generally in said forward direction from said first end and a raised position wherein said second end is elevated from said first position;

first jack means interposed between said lorry and said arm, said first jack means having a first end and a second end, said first end being interconnected with said lorry at a second predetermined location remote from said first predetermined location, said second end being interconnected with a portion of said arm remote from said first end thereof, said first jack means being selectively operable to exert a first biasing resistance inhibiting the pivoting motion of said arm relative to said lorry;

a jib having a first end and a second end opposite said first end, said first end being telescopically interconnected with said second end of said arm such as to permit telescopic discplacement of said jib relative to said arm when in said forward and said rearward directions when said arm is in said lowered position;

second jack means interposed between said arm and said jib, said second jack means being selectively operable to exert a second biasing resistance inhibiting the telescopic displacement of said jib relative to said arm;

platform means having a forward end and a rearward end, said forward end of said platform means being hingedly interconnected with said second end of said jib, said rearward end of said platform means extending in said rearward direction from said forward end thereof, said piece of equipment being mountable on said platform means, said platform means being displaceable in said first and second directions relative to said lorry by the telescopic displacement of said jib relative to said arm between a forward position wherein said platform means is generally disposed over said lorry and a rearward position wherein a substantial portion of said platform means extends rearwardly from said lorry beyond said rearward end of said lorry;

roller means interposed between said platform means and said rearward end of said lorry, said roller means permitting sliding movement of said platform means relative to said lorry and further permitting pivotal movement of said platform means thereabout when said platform means is in said rearward position, said first jack means being selectively operable to inhibit said pivotal movement;

pulley means interconnected with said jig; and cable means having a first end, a second end opposite said first end, and an intermediate portion interposed said first end and said second end, said first end of said cable means being interconnected with said piece of equipment, said second end being interconnected with a portion of said platform means remote from said forward end thereof, and said intermediate portion extending partially around said pulley means; whereby, upon displacement of said piece of equipment rearwardly, said cable means exerts a force on said pulley means such as to displace said platform means rearwardly to said rearward position and further whereby said platform means is thereafter pivoted about said roller means by the weight of said platform means and said piece of equipment.

2. The apparatus of claim 1 wherein said piece of equipment further comprises propulsion means for driving said piece of equipment, such that, when said platform means is in said forward position and said propulsion means is operated to drive said piece of equipment in said rearward direction relative to said platform means, said cable means acts through said pulley means to displace said platform means in said rearward direction relative to said lorry.

3. The apparatus of claim 1 further comprising first valve means selectively operable to control said first biasing resistance of said first jack means.

4. The apparatus of claim 1 further comprising second valve means selectively operable to control said second biasing resistance of said second jack means.

5. The apparatus of claim 1 wherein said roller means are rotatably interconnected with said rearward end of said lorry, said platform means engaging the peripheral surface of said roller means.

6. The apparatus of claim 1 further comprising a reference mark on said platform means visually indicating when said platform means is in said rearward position.

7. The apparatus of claim 1 further comprising support means selectively interposed between said rearward end of said lorry and the ground such as to assist in the support of said lorry, said platform means, and said piece of equipment.

8. Apparatus for unloading a piece of equipment from a lorry having a forward end and a rearward end opposite said forward end, said lorry defining a forward direction from said rearward end toward said forward end and a rearward direction from said forward end toward said rearward end, said piece of equipment having propulsion means selectively operable to displace said piece of equipment, said apparatus comprising:

an arm having a first end and a second end opposite said first end, said first end being pivotally interconnected with said lorry at a first predetermined location remote from said rearward end, said arm being pivotable between a lowered position wherein said second end extends generally in said forward direction from said first end and a raised position wherein said second end is elevated from said first position;

first resistance means interposed said arm and said lorry and exerting a first biasing resistance inhibiting the pivoting motion of said arm relative to said lorry;

a jib having a first end and a second end opposite said first end, said first end being telescopically interconnected with said second end of said arm such as to permit telescopic displacement of said jib relative to said arm when in said forward and said rearward directions when said arm is in said lowered position;

second resistance means interposed said arm and said jib and exerting a second biasing resistance inhibiting the pivoting motion of said jib relative to said arm;

platform means having a forward end and a rearward end, said forward end of said platform means being hingedly interconnected with said second end of said jib, said rearward end of said platform means extending in said rearward direction from said forward end thereof, said piece of equipment being mountable on said platform means, said platform means being displaceable in said first and second directions relative to said lorry by the telescopic displacement of said jib relative to said arm between a forward position wherein said platform means is generally disposed over said lorry and a rearward position wherein a substantial portion of said platform means extends rearwardly from said lorry beyond said rearward end of said lorry;

fulcrum means interposed between said platform means and said rearward end of said lorry when said platform means is in said rearward position, said platform means being pivotable about said fulcrum means in said rearward position as said arm is pivoted relative to said lorry, said first resistance means selectively inhibiting the pivotal movement of said platform means about said fulcrum means; and power transmission means interposed between said piece of equipment and said lorry such that displacement of said piece of equipment in said rearward direction relative to said platform means causes displacement of said platform means in said rearward direction relative to said lorry.

9. The apparatus of claim 8 wherein at least one of said first and second resistance means comprises jack means.

10. The apparatus of claim 9 wherein said jack means is interconnected with a source of fluid and further wherein said apparatus further comprises adjustable valve means interposed between said jack means and said source of fluid whereby the resistance of said jack means is selectively adjustable by adjustment of said adjustable valve means.

11. The apparatus of claim 8 wherien said fulcrum means comprises roller means rotatably interconnected with said rearward end of said lorry.

12. The apparatus of claim 8 wherein said power transmission means comprises:
pulley means interconnected with said jib; and
cable means having a first end, a second end opposite said first end, and an intermediate portion interposed between said first end and said second end, said first end of said cable means being interconnected with said piece of equipment, said second end being interconnected with a portion of said platform means remote from said forward end thereof, and said intermediate portion extending partially around said pulley means; whereby, upon displacement of said piece of equipment rearwardly, said cable means exerts a force on said pulley means such as to displace said platform means rearwardly to said rearward position and further whereby said platform means is thereafter pivoted about said roller means by the weight of said platform means and said piece of equipment.

13. The apparatus of claim 8 further comprising a reference mark on said platform means visually indicating when said platform means is in said rearward position.

14. The apparatus of claim 8 further comprising support means selectively interposed between said rearward end of said lorry and the ground such as to assist in the support of said lorry, said platform means, and said piece of equipment.

15. A method for unloading a piece of equipment from a lorry having a chassis, a forward end, a rearward end, an arm pivotally interconnected with said chassis, a jib reciprocably interconnected with said arm, platform means for supporting said piece of equipment hingedly interconnected with said jib, fulcrum means interposed said rearward end of said lorry and said platform means, and pulley means interconnected with said jib, said lorry defining a forward direction from said rearward end toward said forward end and a rearward direction from said forward end toward said rearward end, said method comprising the steps of:
interconnecting one end of a cable to a portion of said lorry in said rearward direction from said jib;
extending said cable in said forward direction from said one end thereof to and partially around said pulley means;
interconnecting the other end of said cable opposite said one end thereof with said piece of equipment;
displacing said piece of equipment in said rearward direction relative to said platform means such that said piece of equipment exerts a force on said cable which, in turn, exerts a force on said jib which causes displacement of said jib and said platform means in said rearward direction relative to said lorry until said piece of equipment and said platform means become displaced sufficiently rearwardly such that said platform means is pivoted by the force of gravity about said fulcrum means;
disconnecting said other end of said cable from said piece of equipment; and
displacing said piece of equipment in said rearward direction from said platform means.

16. The method of claim 15 wherein said piece of equipment further comprises propulsion means selectively operable to propel said piece of equipment such that said steps of displacing said piece of equipment in said rearward direction are each accomplished by operation of said propulsion means.

17. The method of claim 15 further comprising the step of:
positioning a stability prop between said rearward end of said lorry and the ground.

18. The method of claim 15 wherein said lorry further comprises first selectively operable resistance means interposed said arm and said lorry to selectively inhibit pivoting of said arm relative to said lorry, said method comprising prior to said first displacing step the step of operating said first selectively operable resistance means to prevent pivoting of said arm relative to said lorry, said method further comprising after said first displacing step the step of operating said first selectively operable resistance means to permit pivoting of said arm and, thereby, to permit pivoting of said platform means relative to said lorry.

19. The method of claim 18 wherein said second step of operating said first selectively operable resistance means comprises operating said first selectively operable resistance means to inhibit the pivoting of said arm, thereby controlling the angular speed of said pivoting of said platform means relative to said lorry.

* * * * *

UNITED STATES PATENT AND TRADEMARK OFFICE
CERTIFICATE OF CORRECTION

PATENT NO. : 4,548,541
DATED : October 22, 1985
INVENTOR(S) : Antoine Corompt

It is certified that error appears in the above-identified patent and that said Letters Patent is hereby corrected as shown below:

Column 1, line 62, delete "of".

Column 2, line 57, delete "plaform" and insert ---- platform ----.

column 5, line 2, delete "discplacement" and insert ---- displacement ----.

Signed and Sealed this

Twenty-ninth Day of April 1986

[SEAL]

Attest:

DONALD J. QUIGG

Attesting Officer　　Commissioner of Patents and Trademarks